Aug. 17, 1943.   G. G. BERGER   2,327,241
APPARATUS FOR MOLDING GRANULAR CORK MATERIAL AND OTHER MATERIAL
INTO ANNULAR RINGS, COLLARS, AND OTHER HOLLOW SHAPES
Filed March 27, 1941   3 Sheets-Sheet 1

INVENTOR
George G. Berger
BY
Moeck & Blum
ATTORNEYS

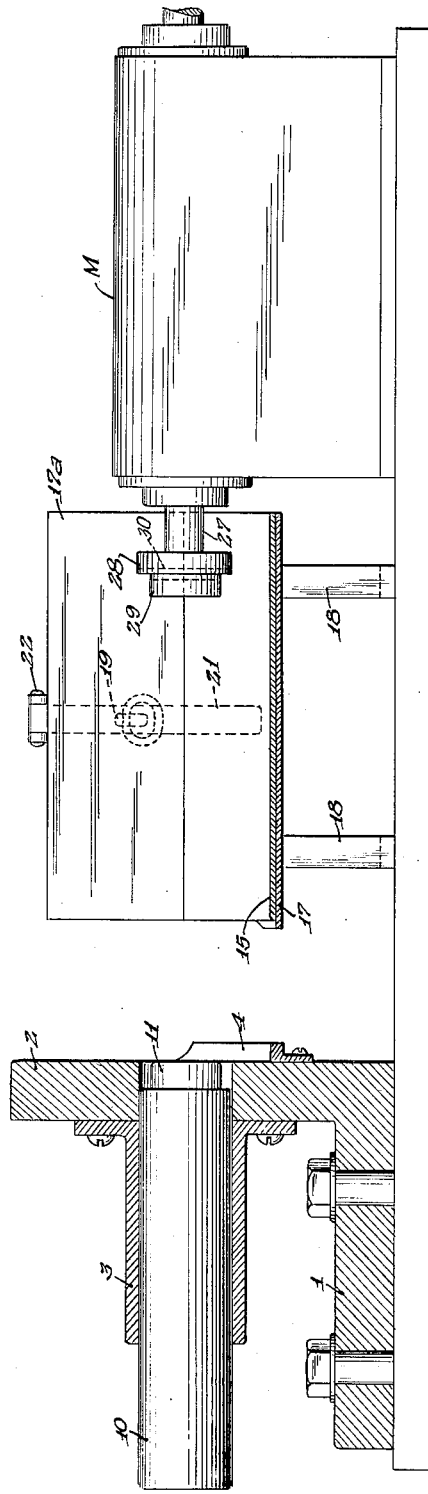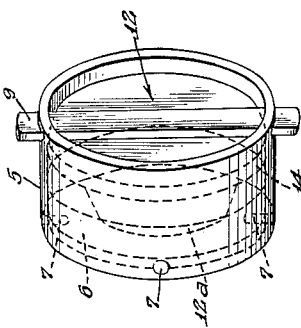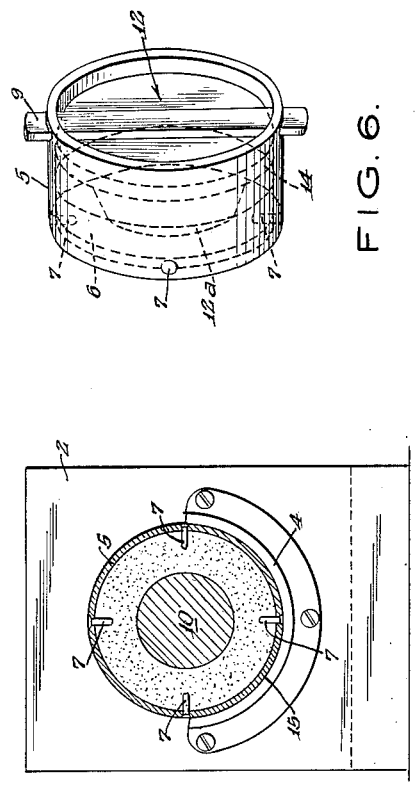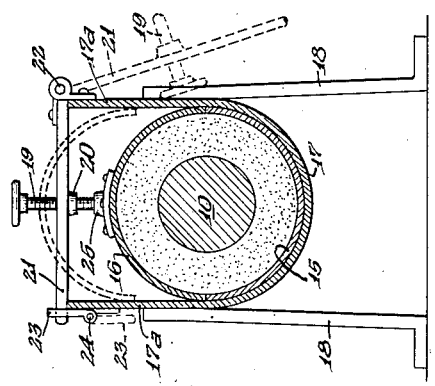

Aug. 17, 1943.   G. G. BERGER   2,327,241
APPARATUS FOR MOLDING GRANULAR CORK MATERIAL AND OTHER MATERIAL
INTO ANNULAR RINGS, COLLARS, AND OTHER HOLLOW SHAPES
Filed March 27, 1941   3 Sheets-Sheet 3

INVENTOR
George G. Berger
BY Moek & Blum
ATTORNEY

Patented Aug. 17, 1943

2,327,241

UNITED STATES PATENT OFFICE 2,327,241

APPARATUS FOR MOLDING GRANULAR CORK MATERIAL AND OTHER MATERIAL INTO ANNULAR RINGS, COLLARS, AND OTHER HOLLOW SHAPES

George G. Berger, New York, N. Y.

Application March 27, 1941, Serial No. 385,452

5 Claims. (Cl. 18—5)

My invention relates to a new and improved method of and apparatus for molding granular cork material and other material into annular rings, collars and other hollow shapes.

One of the objects of the invention is to provide a method of and apparatus for molding such material into annular rings and annular collars which have thin walls of non-uniform cross-section.

Another object of the invention is to provide an apparatus and means whereby special shapes can be molded cheaply and readily on a large scale.

Another object of the invention is to provide improved apparatus which can be readily assembled and in which the material can be readily handled.

Another object of the invention is to mold such material into bodies which have thin walls, with minimum waste.

Other objects of the invention will be stated in the annexed description and drawings which illustrate preferred embodiments thereof.

Fig. 3 illustrates the apparatus which is shown in Fig. 1 and Fig. 2, after the mold has been removed, and prior to the insertion of the next mold into the apparatus.

Figure 1:
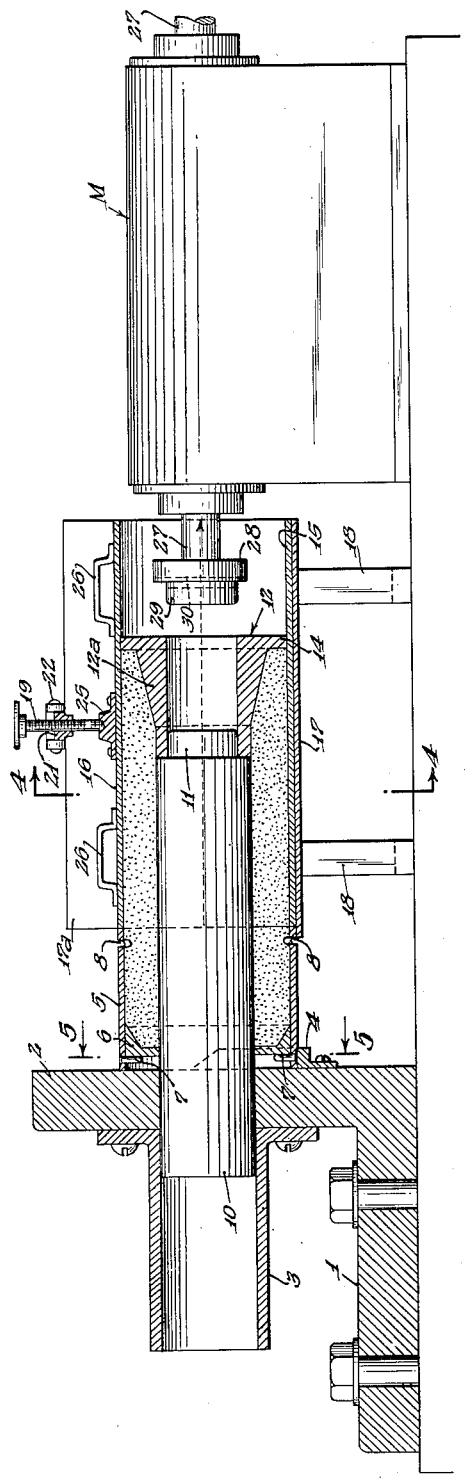
Fig. 1 is a side elevation, partially in section, of the first embodiment of the improved apparatus, showing the ram in its initial or inoperative position.

Figs. 4 and 5 are respectively sectional views on the lines 4—4 and 5—5 of Fig. 1.

Fig. 6 is a perspective view showing the mold after it has been removed from the apparatus.

Figures 7, 8:
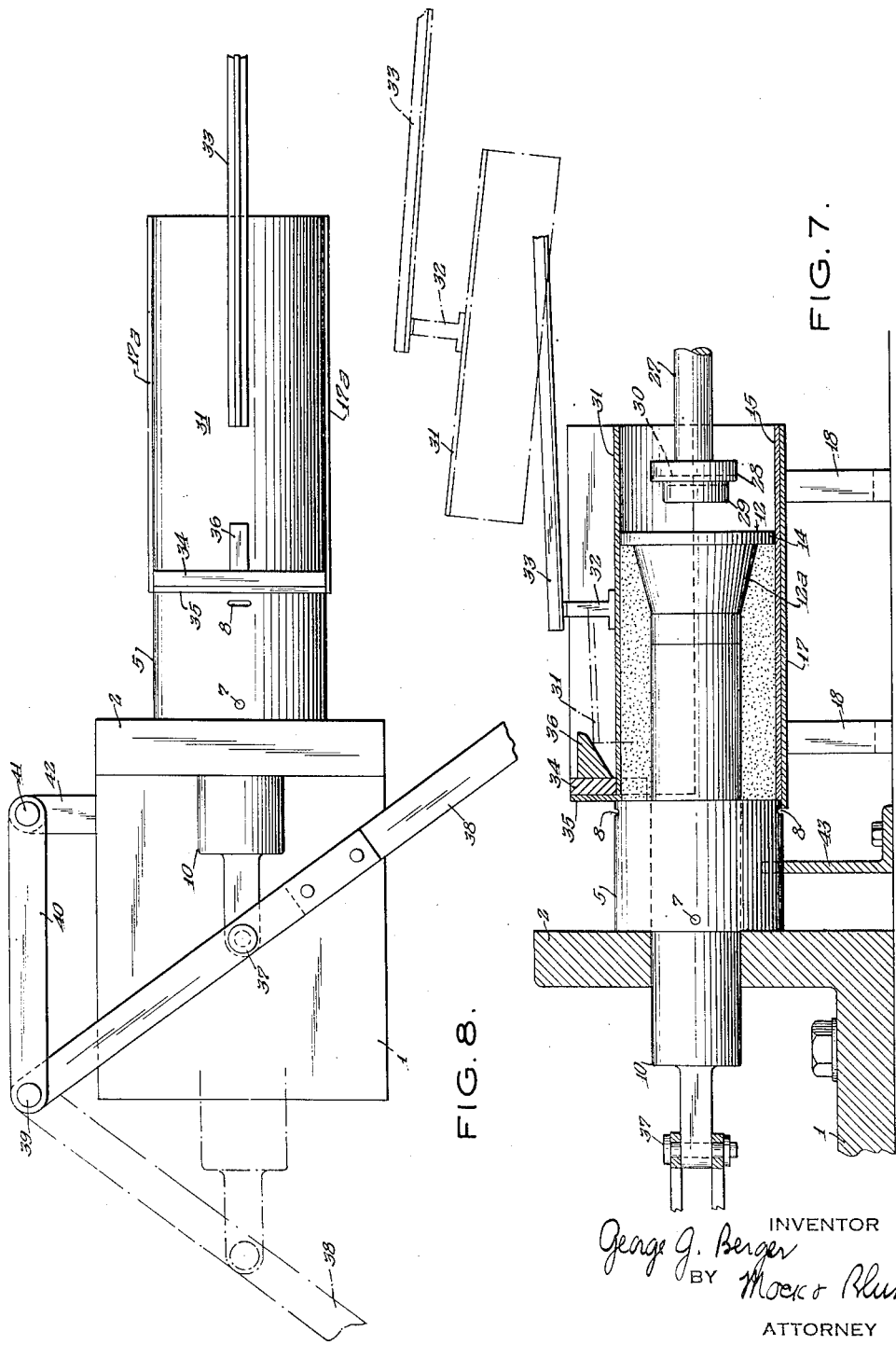

Fig. 7 is a side elevation, partially in section, of a second embodiment of the invention. Fig. 7 corresponds generally to Fig. 1.

Fig. 8 is a top plan view of Fig. 7.

The apparatus is intended to treat the usual cork composition in which loose granular cork particles have been coated with a suitable binder. This binder connects the cork particles to each other, under the action of heat and pressure. This cork composition and the method of making the same are well known per se. The invention is not limited to any particular type of cork composition.

Heretofore, this cork composition, which is quite resilient, has been compacted to shape under pressure in a sectional mold, whose parts were fastened to each other until the binder had set or hardened. The assembled or "pinned" mold was put into an oven, or external heat was otherwise applied to the "pinned" mold, in order to hasten the setting of the composition.

The methods and devices heretofore used, have not made it possible to mold special shapes quickly and cheaply, on a large scale. The loose granular material occupies a much greater volume than the compacted material. The molds were made large enough to receive the loose material, thus providing unnecessary filler space in the molds. This made the molds very large and heavy.

Considerable time was lost in assembling the various parts of the mold, in pouring the loose material into the mold, and then carrying the assembled mold to the press. The methods heretofore in use have made it possible to mold only cork bodies whose walls had considerable thickness. If a thin-walled cork body was desired, it was necessary first to mold a body with a thick wall, and then to cut away this wall. According to the improved method, it is possible directly to mold cork bodies from loose resilient cork particles, in which the thickness of the wall is as low as $\frac{3}{32}$ inch or less at the thin end.

Fig. 1 shows a base plate 1 which is suitably connected to the frame of the machine and which is provided with a standard 2. A sleeve bearing 3 is suitably fixed to the rear face of the standard 2. A seat 4, of semi-cylindrical shape, is provided at the front face of the standard 2. This seat 4 is also connected to the standard 2 in any suitable manner, and it serves to detachably support the mold 5, and to hold the mold in proper alignment with the other parts of the apparatus. The mold 5 may be of any shape, and the shape of seat 4 may correspondingly vary. The mold 5 is of cylindrical shape in this embodiment and it is provided with a detachable ring 6, which is held against rearward movement relative to the mold 5, by means of a series of inwardly directed pins 7. The outer end of each pin 7 is fixed to the wall of mold 5.

The wall of the mold 5 is provided with aligned slots 8, through which the retaining bar 9 can be thrust, as illustrated in Fig. 6 and as will be later more fully explained.

A plunger rod 10 is slidably mounted in the bearing 3, and said rod 10 fits closely but slidably in a bore of the standard 2 and also in another bore which is provided in the ring 6. At its front end, the rod 10 is provided with a reduced end 11, which fits detachably in a head 12. The outer wall of the main body 12a of this detachable head 12 is of frusto-conical shape, and said detachable head 12 is provided with an enlarged annular end-flange 14.

This end-flange 14 fits snugly but slidably against the interior walls of trough 15 and its detachable cover 16, whose edges form butt-joints with the edges of the trough 15. The trough 15 and its cover 16 are respectively of semi-cylindrical shape in this embodiment. The trough 15 is welded or otherwise suitably secured to an outer shell 17, which has upstanding planar walls 17a. These walls 17a are fixed to the upright legs of the supports 18, by spot welding or in any other suitable manner. The cover 16 can be held tightly in closed position, by means of a pressure screw 19, which extends through a tapped hub 20 of a top plate or bar 21. The plate or cross-bar 21 is pivotally connected at 22 to the respective wall 17a of the shell 17, so that said cross-bar 21 can be readily turned into the broken-line position which is illustrated in Fig. 4. The cross-bar 21 is held detachably in the full-line position which is shown in Fig. 4, by means of a latch 23, which is pivotally connected at 24 to the respective wall 17a of the shell 17. The pressure screw 19 is preferably centrally located intermediate the ends of the cover 16, and the tip of said pressure screw 19 bears against the recess of a boss 25, which is rigidly connected to the top of the cover 16. The cover 16 is provided with hand-holds 26.

A ram 27 is provided with a head 28, which has an extension 29. This ram 27 is moved horizontally to-and-fro by means of conventional hydraulic mechanism or other conventional actuating mechanism which is generally designated as M.

The method of using the apparatus is as follows:

The rod or plunger 10 is moved rearwardly to the position which is shown in Fig. 3, until the extension 11 is located in the bore of the standard 2. A mold 5, assembled with its ring 6, is then located in the position shown in Fig. 1. Said mold 5 is partially supported by the member 4, and it is partially supported by the shell 17. This shell 17 has a lip which supports the front end of mold 5, so that the mold 5 is held aligned with trough 15, and the adjacent edge-walls of mold 5 and of trough 15 form a tight butt-joint.

At this time the cover 16 is out of its closing position. The rod or plunger 10 is then moved by hand or otherwise to the position shown in Fig. 1, and it is then assembled with the head 12. The flange 14 of head 12 is supported by trough 15.

Figure 2:
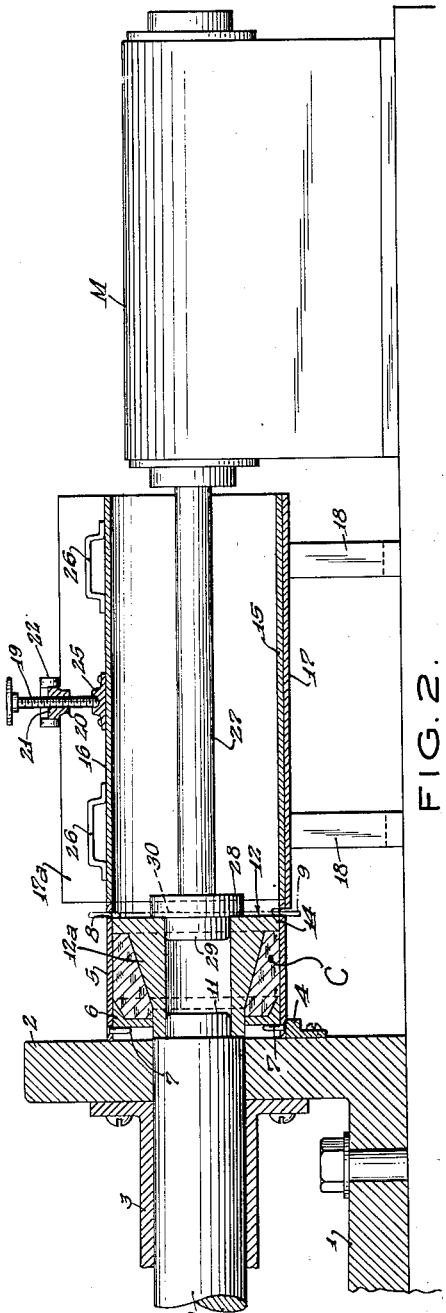
Fig. 2 is a view similar to Fig. 1, showing the ram in its final position.

A predetermined weight or mass of the cork composition is then placed in trough 15, before applying the cover 16, so as to fill the interior space of the trough and of its cover, after the cover has been closed, as much as possible. Mechanical or hydraulic pressure is then applied to the ram 27, so as to move it to the left of its position which is shown in Fig. 1. This movement is designated as a forward movement. The extension 29 enters the bore of the head 12 and the head 28 exerts forward pressure against the front end-wall of the flange 14, so that the plunger or rod 10 is moved forwardly or to the left. The cork composition is compressed between the ring 6 and the head 12 and its flange 14, and also between the inner walls of the mold 5 and the adjacent wall of the plunger 10. The ring 6 is held against longitudinal movement relative to the mold 5, during this forward movement of the head 12, by means of the pins 7. The result of this operation is shown in Fig. 2, which shows the flange 14 located in the mold 5, so that a highly compressed cork body C of general frusto-conical shape has been formed in the mold 5. During this forward movement of the head 12 towards the stationary ring 6, the plunger 10 fills the bore of said ring 6 until said bore is filled by the shank of member 12. The locking bar 9 is now inserted through slots 8, and through the intermediate recess 30 of the head 28, thus locking head 12 in position in mold 5, under the full pressure of the ram 27. The ram 27 is now moved away from the head 12, and the member 10 is moved to the left of the position which is shown in Fig. 2, so that it is possible to remove the mold 5 from the apparatus, together with the ring 6 and the head 12. The mold 5 and its assembled and locked members 6 and 12 and the body C of highly compressed cork composition, under full maintained pressure, can now be heated in a suitable furnace, so as to set the cork composition. The bar 9 prevents the head 12 from moving outwardly, while the cork composition is set under heat and pressure. The retaining bar 9 can then be removed and the head 12 separated from the completed cork body C, which can then be readily removed from the mold.

The complete cork body has a through-and-through bore, and its wall is of non-uniform thickness. Bodies of different shapes can be molded by using molds whose interior walls have various shapes, and also by using rings 6 of different shapes. I can use a mold whose wall is of non-uniform thickness, and numerous other variations and omissions can be made from the preferred embodiment, without departing from its spirit. In the final position shown in Fig. 2, the rear end of the cylindrical shank of head 12 may abut the front wall of standard 2, or said rear end of head 12 may be spaced from the front wall of standard 2.

The rear cylindrical shank of head 12 partially laterally overlies the bore of standard 2, so that said shank cannot be pushed into said bore.

Said cylindrical shank fits snugly in the bore of ring 6, and part of said shank projects rearwardly relative to ring 6, when the parts are in the final position shown in Fig. 6. The plunger 10 is then moved to the position shown in Fig. 3, until the reduced end 11 is spaced from the head 12. The mold 5 and its rings 6 and its head 12 can then be lifted out of position. The cover 16 may be closed or open while the mold 5 and its ring 6 and its head 12 are thus lifted out of position.

After the composition has set to final shape, the locking bar 9 and the head 12 can be readily removed, and the completed cork article can then be readily ejected from the mold by applying force to the ring 6, which is freely movable away from the retaining pins 7.

The tapered outer wall of body 12 extends substantially up to the bore of ring 6, when the parts are in the final position of Fig. 2.

The tapered inner wall of ring 6 then overlies the tapered outer wall of body 12. The entire mass of cork composition is thus subjected to lateral pressure as well as longitudinal pressure, which is very important in making a dense and strong thin-walled cork article.

The invention relates particularly to making a body from particles of resilient cork. However, it is not limited to any material or to any combination of materials.

The charge of material which is supplied to the trough 15, to make each cork object, can be weighed accurately. It is not necessary to have this charge fill the space between plunger 10 and head 12, and trough 15 and cover 16, immediately after the closing of cover 16, and before pushing the head 12 and the plunger 10 rearwardly. If the charge of material is accurately measured, it will fill said space after the head 12 and plunger 10 have been pushed rearwardly, and before the flange 14 enters mold 5, or before the front cylindrical shank of head 12 enters the mold 5. The degree of compression of the cork object C can therefore be accurately regulated.

A horizontal press is illustrated in this embodiment, but said press could be mounted vertically, if desired.

For convenience the members 6 and 12 may be designated as mold members, and the member 10 may be designated as a supplemental mold member. The left-hand end of the mold 5, referring to Figs. 1 and 2, may be designated as the second open end of said mold 5. The other opposed open end of said mold 5 may be designated as the first open end of said mold. During the molding operation, the member 6 is held by pins 7 against longitudinal movement relative to the mold 5, in a direction towards the second open end of the mold. The mold member 12 is moved towards said second open end, in unison with the member 10.

When the cover 16 is closed, the combined members 15 and 16 may be designated as a hopper. The bore of the member 12 is merely for convenience, so that the members 11 and 29 can enter said bore for better alignment of the parts. Said bore can be omitted, or it can be replaced by recesses at the front and rear ends of the member 12.

In the second embodiment, the trough 15 is provided with a cover 31 which is rigidly fastened to a stud 32, which is rigidly fastened to a lever 33. The lever 33 is suitably mounted on the frame of the machine for longitudinal sliding movement and also for rocking movement, so that the cover 31 may be moved to the open position which is illustrated in broken lines in Fig. 7.

The outlet end of the trough 15 is provided with a cross-bar 34, which is suitably fixed to the upstanding walls 17a. This cross-bar 34 is provided with a stop flange 35, which limits the sliding movement of the cover 31, in a direction towards the outlet end of the trough 15. The trough 15 and the cover 31 are respectively of semi-cylindrical shape, and the underside of the cross-bar 34 has a recess of semi-cylindrical shape, in which the cover 31 fits accurately, when the cover 31 is in tight closing position.

The cross-bar 34 is provided with a guide projection 36, whose bottom wall is tapered. As indicated in broken lines in Fig. 7, when the cover 31 is pushed longitudinally towards the outlet end of the trough 15, the respective end of the cover 31 contacts with the underside of the guide member 36, so that the cover 31 is accurately guided into closing position. The downwardly projecting portion 35 of the member 34 acts as a stop to limit the longitudinal movement of the cover 31.

When the ram 27 is moved to exert the required pressure, either by hydraulic or mechanical means, the plunger 10 is automatically pushed into the position shown in Fig. 2. It is subsequently necessary to push the plunger 10 into the release position which is shown in Fig. 3, in order to remove the mold and its assembled parts from the apparatus. For this purpose the end of the plunger 10 is pivoted at 37 to a lever 38, which is pivoted at 39 to a link 40, which is pivoted at 41 to a fixed frame member 42.

The operator can thus manually move the lever 38 to the final position indicated in broken lines in Fig. 8, thus moving plunger 10 to the position shown in Fig. 3.

The full-line position of the lever 38 which is shown in Fig. 8, corresponds to the position of the plunger 10 which is shown in Fig. 1 and also in Fig. 7.

The slidably guided cover shown in Fig. 7, downwardly presses the charge of cork material, so that this substantially fills the space which is shown in Fig. 1, prior to the time that pressure is applied by the ram 27.

Fig. 7 shows a removable support 43 for the mold 5. The top wall of this support has a V-shaped recess, in which the mold 5 is supported.

The apparatus can be used with molds of different sizes, to mold articles of different sizes, by changing the molds and also changing the troughs 15, and the heads 12 etc., while using the frame and the essential parts of the apparatus.

I have shown preferred embodiments of my invention, but it is clear that numerous changes and omissions can be made without departing from its spirit.

For example, if the extension 11 of plunger 10 is omitted, the rear extension of the head or piston-member 12 will push plunger 10 wholly out of the bore of the rear wall-member 6 of the mold.

The piston member 12a may be made of any material, and it may have any shape.

The cork material may be set without heating the same, by merely maintaining the material under pressure for a suitable period of time, at ordinary room temperature of about 70° F.

I claim:

1. Apparatus for molding a body from loose material, comprising a mold having a longitudinal axis and a first open end and a second open end, said ends being opposed and being in alignment along said longitudinal axis, the second open end being located rearwardly of the first open end, a support for said mold, a first mold-member located in said mold rearwardly of the said first open end, said first mold-member having a periphery which fits slidably against the inner wall of the mold, retaining means secured to said mold and limiting the rearward movement of the first mold-member towards the second open end and permitting the forward movement of said first mold-member longitudinally towards said first open end, said first mold-member having a longitudinal bore, a plunger fitting slidably in said bore and movable to-and-fro relative to said first mold-member in a direction parallel to said longitudinal axis, said plunger being forwardly movable into and rearwardly movable wholly out of the bore of said first mold-member, a hopper which is aligned with said mold when said mold is mounted on said support, said hopper being located forwardly of said mold, said hopper having an end-wall which makes a snug fit with the end-wall of the mold at its first open end, said plunger being movable forwardly through said mold into said hopper and being rearwardly movable wholly out of said hopper, the inner wall of said hopper being of the same size and shape as the inner wall of the mold adjacent said first open end, a second mold-member, a front end-wall of said plunger being shaped to abut the rear end-wall of the second mold-member, said plunger being freely rearwardly movable relative to said second mold-member, said second mold-member having a peripheral portion which fits snugly and slidably against the inner wall of the hopper, means adapted to exert a rearward actuating force on said second mold-member to move it rearwardly in unison with the plunger while the first mold-member is held against rearward movement by said retaining means, the second mold-member having a rear shank which is shaped to close the bore of the first mold-member, the second mold-member being rearwardly movable out of the hopper and wholly into the mold into a position in which the shank of the second mold-member closes the bore of the first mold-member, holding means adapted to detachably lock the second mold-member in said position in said mold, said mold and said retaining means and said mold-members being movable together as a sub-unit away from said support and away from said hopper and siad plunger and independently of said hopper and said plunger when the second mold-member is in said position.

2. A device according to claim 1 in which a part of the inner wall of the first mold-member is flared away from said longitudinal axis, and in which a part of the periphery of the second mold-member is also flared away from said longitudinal axis.

3. A device according to claim 1 in which a part of the inner wall of the first mold-member is flared away from said longitudinal axis, a part of the periphery of the second mold-member being also flared away from said longitudinal axis, said flared part of the inner wall of the first mold-member being spaced laterally from the flared part of the periphery of the second mold-member when the second mold-member is in final position in the mold, the flared part of the inner wall of the first mold-member longitudinally overlying the flared part of said periphery, when the second mold-member is in said final position.

4. Apparatus for molding a bored article from loose material, comprising a mold having a longitudinal axis and a front open end and a rear open end which are spaced from each other along said axis, said mold having a first mold-member located therein, said first mold-member having a bore which is concentric with said axis, a longitudinally movable plunger shaped to fit snugly and slidably in said bore and movable longitudinally forwardly into said bore and movable rearwardly longitudinally wholly out of said bore, a second mold-member spaced forwardly and longitudinally from the first mold-member, said second mold-member having a shank which is shaped to fit snugly and slidably in said bore, said second mold-member having a continuous wall of which a part fits snugly and slidably against the inner wall of the mold, the second mold-member and the plunger being longitudinally and rearwardly movable in unison until the plunger is moved wholly out of said bore and said shank simultaneously enters said bore and contacts the wall of said bore, means fixed to said mold for limiting the rearward movement of the first mold-member relative to the mold, said mold and said mold members being laterally movable in unison relative to said plunger when said plunger is wholly out of said bore and said shank is located in said bore.

5. Apparatus for molding a bored article from loose material, comprising a mold having a longitudinal axis and a front open end and a rear open end which are spaced from each other along said axis, said mold having a first mold-member located therein, said first mold-member having a bore which is concentric with said axis, a longitudinally movable plunger shaped to fit snugly and slidably in said bore and movable longitudinally forwardly into said bore and movable longitudinally rearwardly wholly out of said bore, a second mold-member spaced forwardly and longitudinally from the first mold-member, said second mold-member having a shank which is shaped to fit snugly and slidably in said bore, said second mold-member having a continuous wall of which a part fits snugly and slidably against the inner wall of the mold, the second mold-member and the plunger being longitudinally and rearwardly movable in unison until the plunger is moved wholly out of said bore and said shank simultaneously enters and closes said bore, means fixed to said mold for holding the first mold-member in a predetermined position in said mold against rearward longitudinal movement relative to the mold, said first mold-member and said second mold-member respectively having cooperating and flared wall-portions inside the mold, the narrowest portion of said flared wall-portions being at the respective rear ends of said flared wall-portions, said mold and said mold members being laterally movable in unison relative to said plunger when said plunger is wholly out of said bore and said shank is located in said bore.

GEORGE G. BERGER.